July 26, 1938.  E. A. ZEBULSKE  2,124,939
AMUSEMENT DEVICE
Filed Oct. 7, 1936  11 Sheets-Sheet 1

INVENTOR
Edward A. Zebulske,
BY
Beau, Brooks, Buckley & Beau.
ATTORNEYS

July 26, 1938. E. A. ZEBULSKE 2,124,939
AMUSEMENT DEVICE
Filed Oct. 7, 1936 11 Sheets-Sheet 5

Fig. 5.

INVENTOR
Edward A. Zebulske,
BY
Beau, Brooks, Buckley + Beau.
ATTORNEYS

July 26, 1938.  E. A. ZEBULSKE  2,124,939
AMUSEMENT DEVICE
Filed Oct. 7, 1936  11 Sheets-Sheet 7

INVENTOR
Edward A. Zebulske,
BY
Beau, Brooks, Buckley & Beau.
ATTORNEYS

July 26, 1938.  E. A. ZEBULSKE  2,124,939
AMUSEMENT DEVICE
Filed Oct. 7, 1936  11 Sheets-Sheet 8

INVENTOR
Edward A. Zebulske,
BY
Beau, Brooks, Buckley & Beau.
ATTORNEYS

July 26, 1938.  E. A. ZEBULSKE  2,124,939
AMUSEMENT DEVICE
Filed Oct. 7, 1936  11 Sheets-Sheet 9

INVENTOR
Edward A. Zebulske,
BY
Bean, Brooks, Buckley & Bean.
ATTORNEYS

Patented July 26, 1938

2,124,939

UNITED STATES PATENT OFFICE 2,124,939

AMUSEMENT DEVICE

Edward A. Zebulske, North Tonawanda, N. Y.

Application October 7, 1936, Serial No. 104,487

13 Claims. (Cl. 104—53)

This invention relates to amusement devices and it has particular relation to vehicle structure and supporting track arrangement for transporting passengers on thrilling rides in amusement parks, at carnivals, fairs, etc.

In designing amusement devices, or so-called rides of the type mentioned, it is desirable to provide an attractive arrangement which promotes curiosity and excitement, as well as appealing to adventurous nature of patrons who are on holiday outings, picnics, excursions, or the like. In order to stimulate interest and appeal, a preliminary labyrinth is provided through which the patron passes, and which is provided with darkened passages with sloping floors and steps arranged in such manner as to have an entrance at a lower or ground level and an exit at an upper level. Upon reaching the upper level and exit of the labyrinth the patrons enter a chamber having a seat or seats at one side thereof.

These seats are provided in cars which are mounted upon wheels that travel upon a downwardly sloping and curved track. After the passengers have been seated, an operator releases the cars and they immediately fall rearwardly in tilting relation toward a substantially horizontal position. The car travels a predetermined distance in this position and then the upper end of the car is directed upwardly about a curved portion of the track until a greater part of its momentum is expended and this upper portion is then pivotally anchored. The lower end of the car containing the seated passengers swings rearwardly beyond the pivoted upper portion until the car approaches a second horizontal position. The chamber in which each car is operated is darkened and the passengers are greatly thrilled by the sudden rearward ride and swinging action.

After the car swings back from its outward position, brakes are applied and the car arrested in an upright position whereby the passengers can be unloaded. Novel mechanism is provided for safety of passengers and for releasing the car and actuating it up the track structure back to its original position for the succeeding cycle of operation.

One object of the invention is to provide an amusement vehicle or ride for transporting passengers in a downward direction in such manner that the vehicle assumes various angular positions with respect to the supporting surface therefor.

Another object of the invention is to provide an amusement vehicle or ride including a normally upright passenger car that tilts backwardly in such position as to carry the passenger over a predetermined course and in a substantially horizontal position.

Another object of the invention is to provide improved mechanism for locking and controlling the passenger car in various positions upon a supporting track structure.

Another object of the invention is to provide an improved mechanism for returning an amusement passenger car up an inclined track structure.

Another object of the invention is to provide novel and improved controlling mechanism for separately controlling different moving parts of the passenger car.

Another object of the invention is to provide an improved passenger car for amusement rides.

Another object of the invention is to provide an improved assembling structure suitable for installation of knockdown track sections.

Referring to the drawings.

Figure 1:
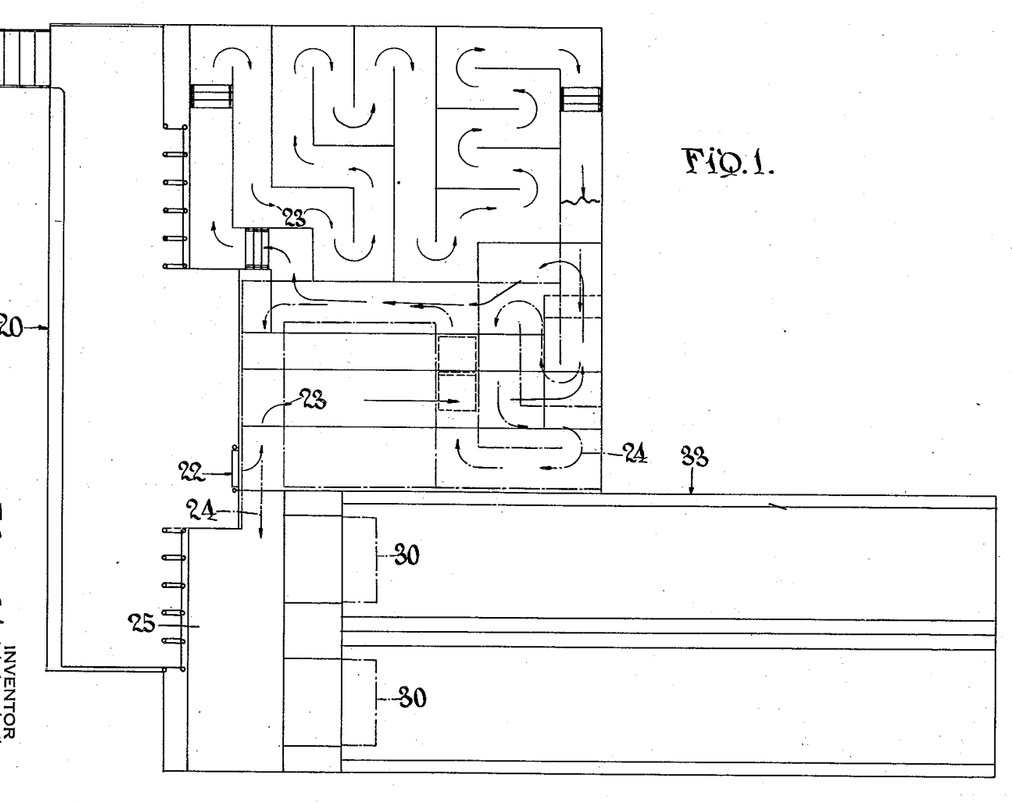
Fig. 1 is a diagrammatic plan of a structure for amusement devices in which the invention has been incorporated.
Figure 2:
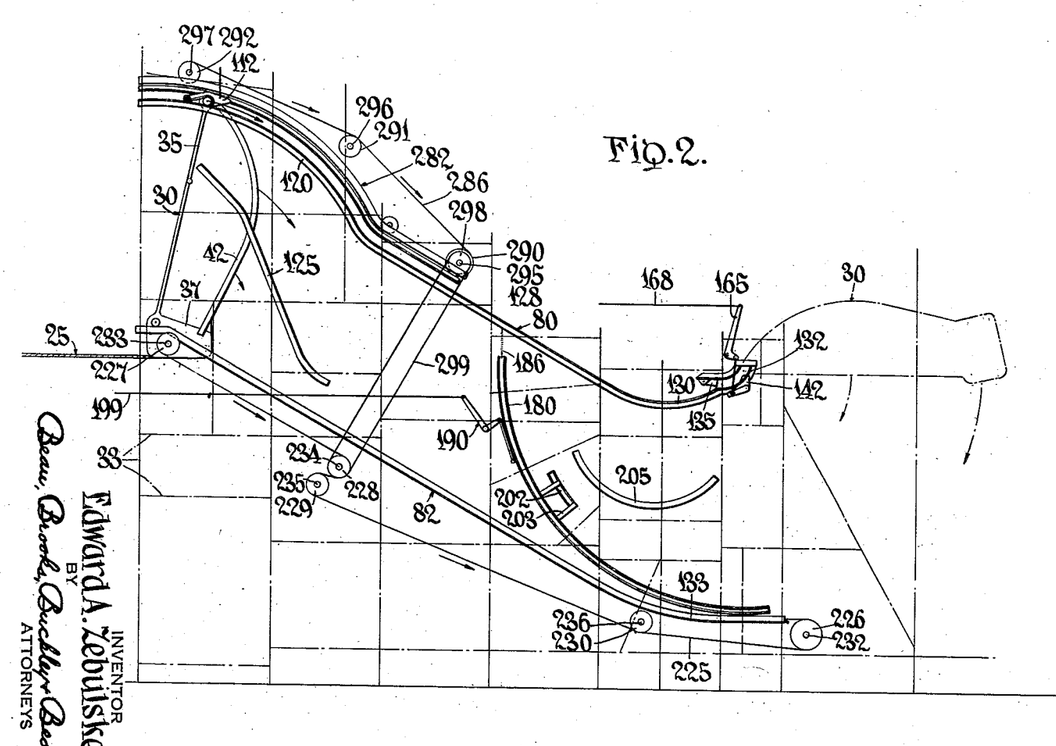
Fig. 2 is a diagrammatic side elevation of a track and car system for riding passengers.

Referring to Figs. 1 and 2, a structure 20 is diagrammatically illustrated for incorporation of the features of the invention. Passengers or patrons are admitted at an entrance 22 and are directed by convenient lights or signs along a course indicated by full line arrows 23 through a labyrinth that is provided with stairs, sloping floors, etc., until the passengers reach an upper elevation along the arrows 24 indicated in broken lines and emerge upon an inclosed platform 25 that is disposed at an elevation considerably above the elevation of the entrance 22. One or more cars 30 shown in broken lines (Fig. 1) is carried upon supporting frame structure 33 and at such position that passengers entering upon the platform can be seated in the car as a desirable consequence of leaving the labyrinth. For convenience the frame structure 33 is shown diagrammatically in several figures by broken lines.

Each car 30 (Figs. 3, 7, and 8) is provided with opposite tubular frames 35 at its front and an upper transverse frame 36 is connected thereto, together with lower side plates 37 which are connected together by means of transverse braces 38, 39 and 40. Rear side frames 42 of the car are curved forwardly and upwardly in such relation that the upper portions thereof and the upper portions of the tubular frames 35 converge to a common connection to the transverse frame 36 at each car side.

Figures 8, 9, 10:
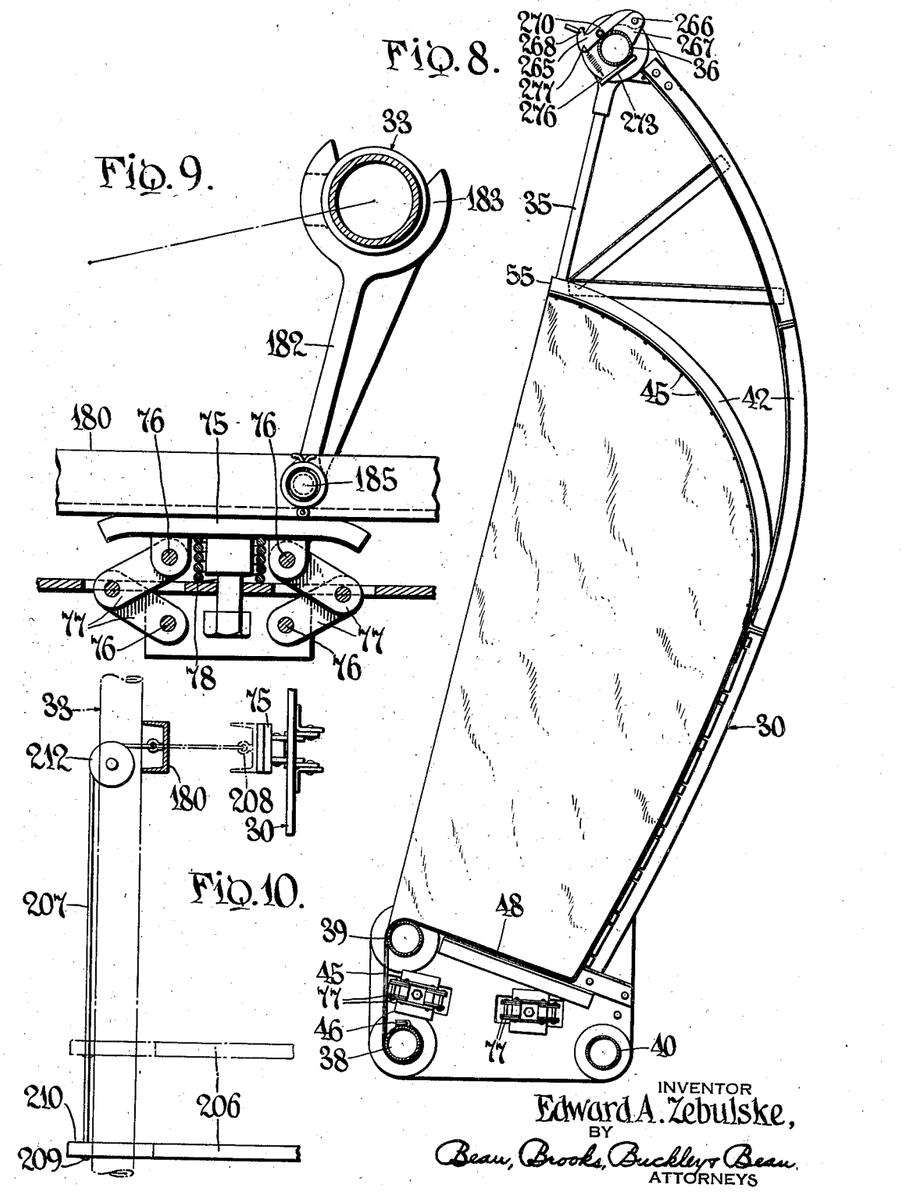
Fig. 8 is a vertical section, with portions shown in elevation, of the passenger car.
Fig. 9 is a plan of a brake arrangement and coacting structure, a portion of which is shown in section.
Fig. 10 is a fragmentary front elevation of a passenger car and adjacent structure, including diagrammatic illustration of platform elevating mechanism.

A relatively heavy sheet of canvas 45, or other sheet or woven material, is connected, as indicated at 46, to the transverse frame brace 38 and is trained upwardly over the brace 39, thence rearwardly to form a seating portion which is connected, as indicated at 48, along the upper portions of the side plates and is further connected in like manner to the car frame along the upwardly extending curved frame members 42.

A transverse safety bar 50 (Fig. 7) which can be composed of one or more bar members, is provided with upright tubular end sections 52 which are slidably mounted upon opposite tubular frame members 35, and a coil spring 53 on each tubular frame is compressible between the upper end of each end section 52 and a frame portion 55 that is connected to the tubular member and to which the spring is connected. These compression springs serve as bumpers in absorbing shocks that might otherwise occur by virtue of the safety bar being moved upwardly.

Figure 7:
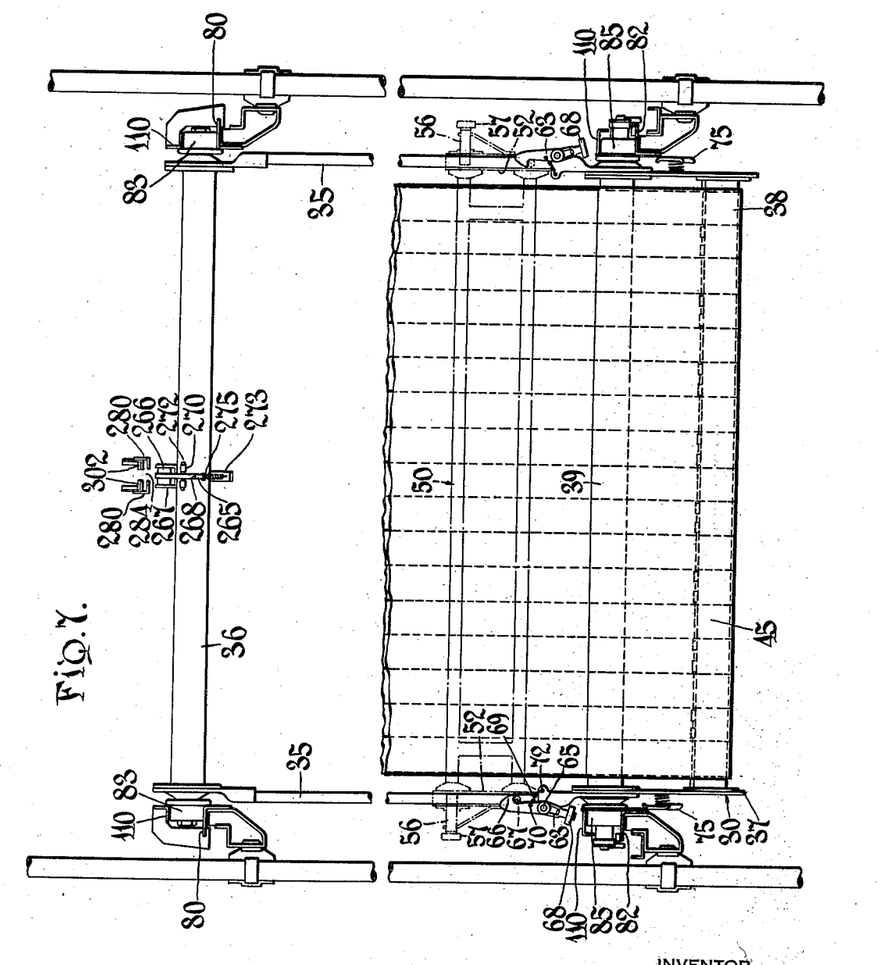
Fig. 7 is a fragmentary front elevation of a passenger car and tracks for supporting it.

An extension 56 at each end of the safety bar 50 is provided with a roller 57 connected thereto in a conventional manner. Each end portion of the safety bar is also provided with a bracket or extension 58 to which a tension spring 59 is connected at one end, as indicated at 60, while its other or upper end is connected, as indicated at 62, to an upper portion of the car frame. This spring always urges the safety bar toward a position at the upper ends of the tubular members 35.

A latch 63 pivoted intermediately of its ends, as indicated at 65, to the car frame is provided with a hook 66 for releasably engaging a pin 67 or other extension formed upon the safety bar 50. The other end of the latch is provided with a roller 68 and the latch end containing the roller is angularly disposed with respect to the end on which the hook 66 is formed. A tension spring 69 having opposite end connections 70 and 72 securing it to the latch 63 and car frame, respectively, constantly urges the hook toward engaging position with the pin 67.

The lower portion of the car along the outer side of each plate 37 is provided with brake shoes 75 which are pivotally connected, as indicated at 76, by means of toggle links 77 to the plate, and a coil spring 78 is disposed under compression between each shoe and the side of the plate. One or more of these brake shoes is provided at each side of the car.

The car 30 is supported upon upper and lower tracks 80 and 82, by means of upper and lower flanged wheels 83 and 85 mounted upon opposite ends of the transverse frame members 36 and 39. It is to be understood that the supporting frame structure and tracks are composed of so-called knock-down sections connected together by means of couplings of known type, such as those disclosed in Patent No. 1,674,734, issued June 26, 1928, to H. F. Maynes.

Figure 15:
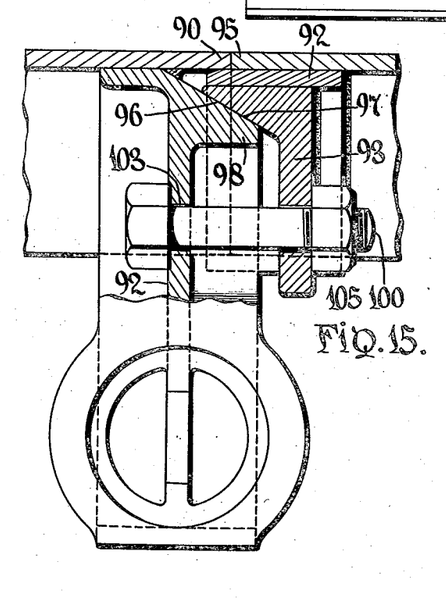
Fig. 15 is a fragmentary longitudinal section, on a larger scale, showing in detail a mechanism for assembling track sections in abutting relation.
Figure 16:
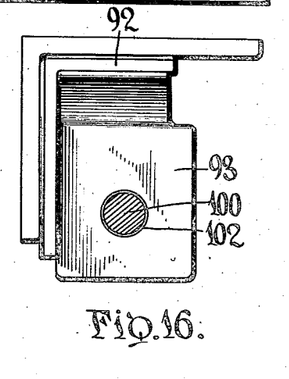
Fig. 16 is an end elevation of one of the abutting sections of a butt joint shown in Fig. 15.

The tracks which are made in sections are provided with joint structure, an example of which is shown in Figs. 15 and 16, for the purpose of insuring proper abutting and flush relation between end portions of the sections. One end portion 90 of a track section, an angle iron section 92, and plate 93 are welded together or otherwise formed integrally in such manner that the angle iron section projects beyond the end portion 90 of the track section that is to be abutted against an end portion 95 of an adjacent track section. The plate is provided with an inclined or beveled surface 96 which is adapted to be wedged against a companion inclined surface 97 formed on an extension 98 of a bracket 99 that is welded or otherwise rigidly secured to the track end portion 95, and to the supporting frame structure 33. A bolt 100 extends through registering openings 102 and 103 formed in the plate 93 and bracket 92, respectively, and by tightening the nut 105 on the bolt, the surfaces 96 and 97 are wedged together, whereby the adjacent ends of the track sections are abutted together firmly in flush relation and in order to prevent disalignment of these parts.

It should be understood that the upper and lower tracks for the wheels 83 and 85 are provided with overhanging guard sections 110 adjacent their forward and upper ends for the purpose of preventing the wheels from accidentally moving out of contact with the supporting track sections.

In the upward and forward position of the car 30 its upper portion is held on each side by means of a trip 112 which is pivoted, as indicated at 113, upon the upper track structure and normally lies in a substantially horizontal position. A hook 115 on each trip engages a car wheel 83 on each side of the car 30 at the upper portion thereof, and the outer end portion of the trip is provided with a beveled or inclined surface 116 leading to the location hook 115. An actuating cable or rod 117 is connected to the outer end of each trip and is adapted to be operated manually for raising the hook of each trip out of engagement with the wheel 83. When the trips 112 are released from the wheels 83, the car immediately tilts rearwardly under the influence of gravity about an arcuate section 120 of the track. The relative positions of the upper and lower ends of the car before the trip is actuated is shown in Fig. 2, wherein each lower wheel 85 rests upon a substantially horizontal track section 122 and, hence, does not tend to roll either forwardly or rearwardly. The lines of curvature of the upper arcuate track section 120 are described about the axis of the lower wheels 85 as a center and in the position thereof shown in Fig. 2. A stop 124 at the front end of each lower track prevents forward displacement of the lower wheel at each side of the car.

After the car 30 begins to tilt rearwardly, the roller 57 on the extension 56 at each end of the safety bar 50 impinges upon the lower surface (Figs. 1 and 4) of an inclined cam rail 125 rigidly supported upon the frame structure 33. Before the roller 57 clears the lower end of the cam rail 125, the safety bar 50 will have been moved downwardly to its operative position and the hook 66 of the latch 63 will have snapped over the pin 67 to hold the safety bar in the position shown in Fig. 7; that is, in such position as to prevent passengers from accidentally falling from the car.

As the upper wheels 83 complete traversing the arcuate section 120 and change their direction of movement in entering upon a straight and inclined track section 128, such change of direction of the upper wheels and the momentum of the car draws each lower wheel from the horizontal track section 122, and then, both the upper and lower ends of the car fall rapidly under the influence of gravity toward the lower portions of the upper and lower tracks. Beyond the arcuate track section 120, the tracks are substantially parallel until the upper track 82 merges into an upwardly curved section 130 which abuts in flush relation an arcuate terminal track section 132 that is curved still further upwardly. The lower track 82 at each side of the car 30 also has an arcuate terminal section 133, but its degree of curvature is greater; that is, the curvature is described on a greater radius than the radius of curvature of the upper arcuate terminal sections. Therefore, the lower end portions of the upper and lower tracks diverge rearwardly, and hence, as the upper wheels 83 travel rearwardly adjacent the rear end portions of the upper track sections, the lower wheels will clear their tracks.

As each upper wheel enters the upper arcuate terminal section 132, it actuates a trip 135 which is pivoted at one end, as indicated at 136, upon an upper guard rail 137 that is provided as a rigid portion of the track structure carried in the supporting frame structure 33 in a position substantially parallel to the track section 132. The lower portion of the trip 135 is substantially horizontally supported in its normal position and thus is disposed at a slight angle to the surface of the track, while the outer end portion of the trip normally constitutes a stop across the path of the wheel 83 upon the track. The lower portion of the trip 135 is movable through a slot 138 formed in the upper guard rail 137 and the upper portion of the trip is formed with a lateral and forwardly projecting flange 139 which overhangs the lateral edge of the upper guard rail 137 and serves as a stop to limit downward gravitational movement of the trip through the slot. After each wheel 83 cams the trip 132 out of its path and passes toward the upper rear end of the terminal track section 132, the trip falls by gravity to its normal position shown in Fig. 3.

Figure 13:
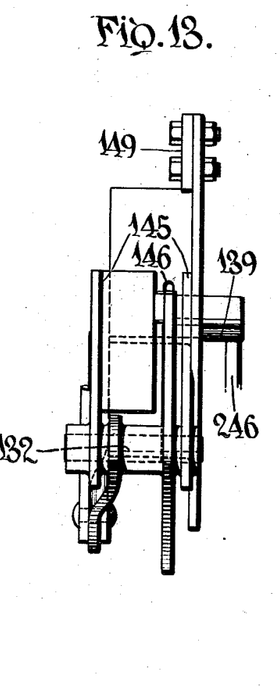
Fig. 13 is a rear end elevation of the structure shown in Fig. 12.
Figure 14:
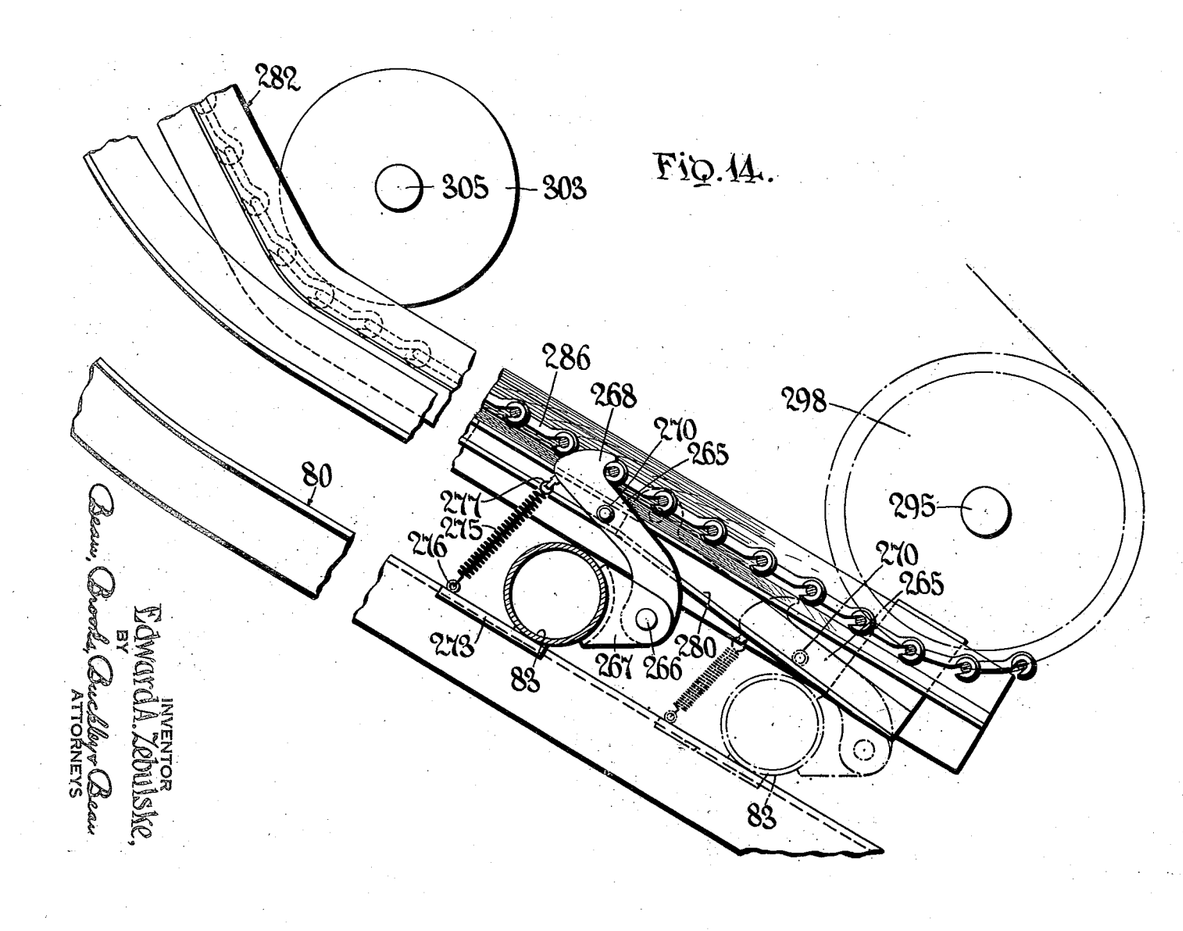
Fig. 14 is a fragmentary side elevation, with portions in section of structure for shifting the upper portion of a passenger car.

In continuing its travel upon the terminal track section 132, each wheel 83 trips one end 140 of a latch 142 which is pivoted, as indicated at 143, intermediate its ends upon bracket plates 145 rigidly mounted upon the track structure by welding, or the like. The latch 142 operates through a slot 146 (Fig. 13) formed through the terminal track section 132 and in the path of the car wheel. Each wheel 83 is then supported adjacent the upper and rear end portion of the terminal track section 132 and upon the upper end 140 of the latch.

Figure 3:
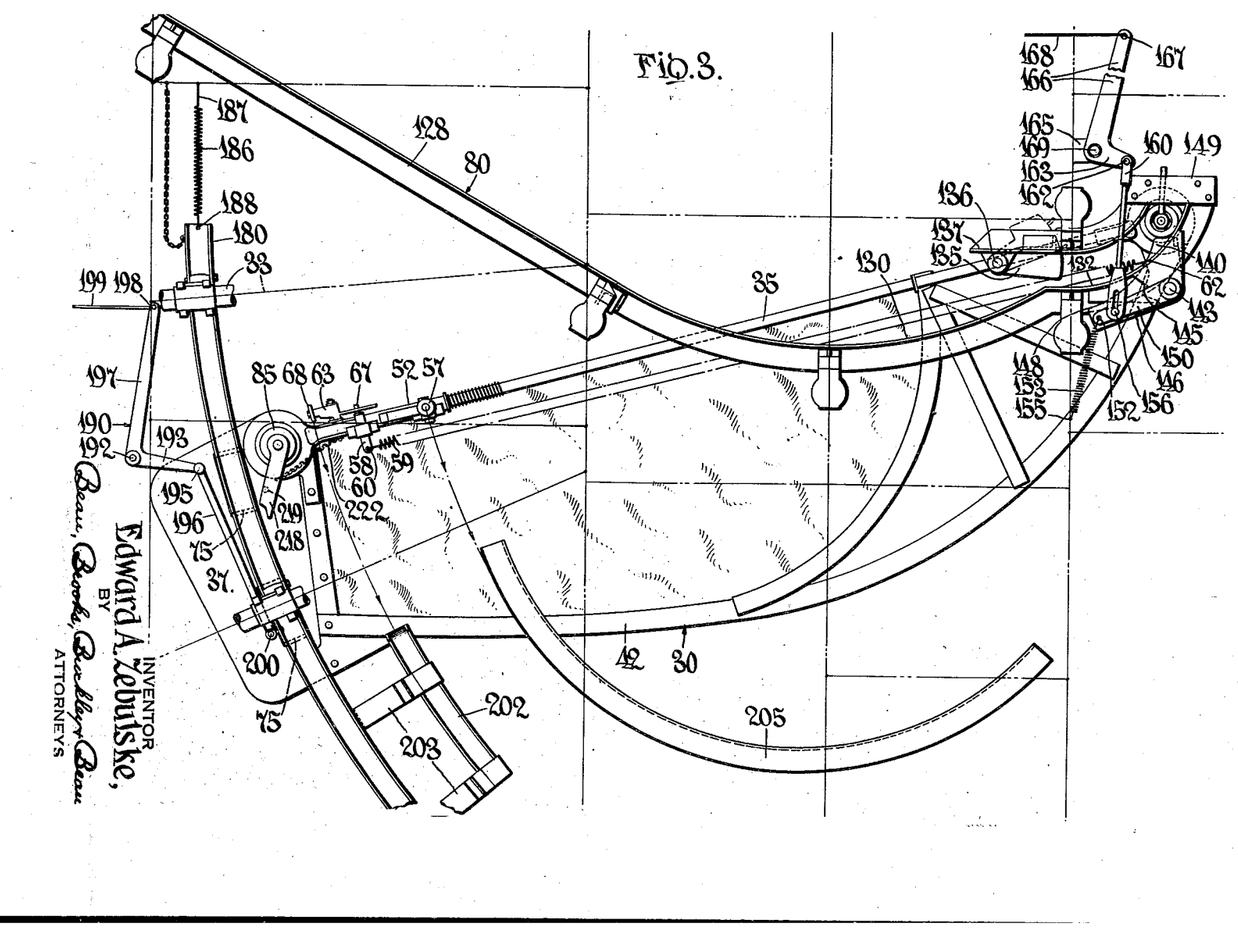
Fig. 3 is a fragmentary side elevation, on a larger scale, of a structure for suspending and controlling a car upon a trackway and illustrating the position of the car in one phase of operation.

An inner latch surface 147 facing the path of movement of the wheel on the track is arcuate and is so positioned with respect to the curved surface of the terminal track section 132 that the end portions 140 and 148 of the latch are alternately pivotable through the slot 146 into the path of the wheel 83, and are normally disposed in the position shown in Fig. 3. A cross member 149 bolted rigidly across the track members 137 and 132 at each side of the track structure insures proper stopping of the upper end of the car 30 when its lower portion swings outwardly, or after the wheels 83 pass the upper end of the latches 142.

An arm 150 is rigidly connected to the latch 142, and the outer end portion of this arm is connected, as indicated at 152, to one end of a tension spring 153. The other end of the tension spring 153 is connected, as indicated at 155, to the stationary supporting frame structure 33. This spring constantly urges the outer end 140 of the latch into the position shown in Fig. 3, where the latch end is adapted to snap behind each wheel after the latter has passed therebeyond toward the upper rear end of the upper terminal section 132.

The arm 150 is also provided with a pin 156, or similar projection, which engages in a slot 158 formed in a lower end portion of a link 160 that has its other or upper end pivotally connected, as indicated at 162, to one arm 163 of a bell crank 165. The other arm 166 of the bell crank has a connection 167 securing it to a cable or rod 168 for manual operation, and a suitable pivotal connection 169 on the supporting frame structure 33 carries the bell crank in its proper relation for actuation. By virtue of the location of the slot 158 downward movement of the link 160 does not actuate the latch 142.

In Fig. 3 the car 30 is shown in such position that each upper wheel 83 has snapped behind the upper end 140 of the latch and the car has assumed substantially a horizontal position. From this position, the lower portion of the car, including its wheels 85, will have cleared the lower tracks and continues to swing rearwardly. The momentum of the car is such that the latter swings about the upper end of the terminal tracks 132 to the position indicated in broken lines of Fig. 2. Then the car swings back in a clockwise direction toward the position shown in Fig. 3. If desired, the car can be permitted to swing one or more oscillations upon the axis of the wheels 83 as the latter are supported upon the upper end 140 of the latch 142. However, satisfactory results have been achieved by permitting the car to swing to the broken line position (Fig. 2) only once during each cycle of operation.

After the car 30 has swung back to the position shown in Fig. 3 from its broken line position of Fig. 2, brake rails 180 on each side of the car are actuated into braking relation with the brake shoes 75. It will be observed that each brake rail 180 is arcuate and its lines of curvature are described about the axis of the wheels 83 while the latter are in their rear upper position; that is, when they are supported upon the latch end 140, as illustrated in Fig. 3. A plurality of actuating arms 182 have end connections 183 pivotally securing them to the frame supporting structure 33, and have inner end connections 185 pivotally securing the arms to the brake rails 180. A coil spring 186 (Fig. 3) having an upper end connection 187 securing it to the frame structure 33 and a lower end connection 188 securing it to the upper end of each rail 180, constantly urges the latter pivotally upon the arms in a direction out of braking engagement with the shoes 75.

A brake actuating bell crank 190 has a pivotal support 192 upon the supporting frame 33, and one arm 193 of the bell crank is pivotally connected, as indicated at 195, to one end of a link 196, while the other arm 197 of the bell crank is connected, as indicated at 198, to a manually operable rod 199. The other end of the link 196 has a pivotal connection 200 securing the brake rail 180 adjacent each side of the car. By actuating the rod 199 to move the bell crank in a clockwise direction (Figs. 3 and 2), the arms 182 are pivoted in such manner as to urge the brake rails into engagement with the shoes 75. The car 30 swings to the right (Figs. 3 and 6) when the brake rails are to be applied and movement of the car tends to increase the braking action because the arms 182 are subjected to force tending to pivot their inner ends, which support the brake rails, toward the path of the brake shoes 75.

A bar 202 (Fig. 3) carried rigidly upon each brake rail 180 by means of brackets 203 is actuated by movement of the brake rail into the path of the roller 68 immediately after the brakes have been applied, and this bar pivots the latch 63, thereby releasing the safety bar 50 which is then urged upwardly by the springs 59. However, an arcuate cam rail 205 rigidly mounted in the supporting frame 33 has a curvature described eccentrically with reference to the path of the axis of the wheels 85 during their movement with the swinging car, and each roller 57 contacts the lower surface of the rail 205 in camming relation before the roller 68 contacts the release bar 202. Hence, the safety bar will not be violently actuated upwardly by the springs 59, but will gradually be moved upwardly as the roller 57 travels to the right (Fig. 3) toward the rear end of the cam rail 205. The roller 57 passes beyond the rear end of the cam rail 205 and then the safety bar 50 continues upward movement sufficiently to insure clearance of the roller 57 above such rear end of the cam rail when the car moves back toward the left. At this stage of the operation, the car 30 will have been gradually stopped by the brakes at such position as to be substantially vertical, and the passengers can then descend therefrom.

Upon actuation of the brake rails 180, which are thus moved inwardly toward the brake shoes 75, a section of floor or platform 206 is raised by means of a cable 207 (Fig. 10) attached at its opposite ends, as indicated at 208 and 209, to each rail 180 and to a projection 210, respectively, formed on each side of the platform 206. An intermediate portion of each cable is trained over a pulley 212 which is mounted in a conventional manner upon the supporting frame 33. The forward end of the platform is provided with a hinge connection 215 (Fig. 6) securing it to the floor 216 and the rear end of the platform rests upon the floor 216. The brake rails 180 remain applied while the passengers leave the car 30 by walking down the elevated platform 206. Then the brake rails are released and they assume their normal position under influence of the springs 186 while the platform is automatically lowered to its original position flush with the floor level.

Figure 4:
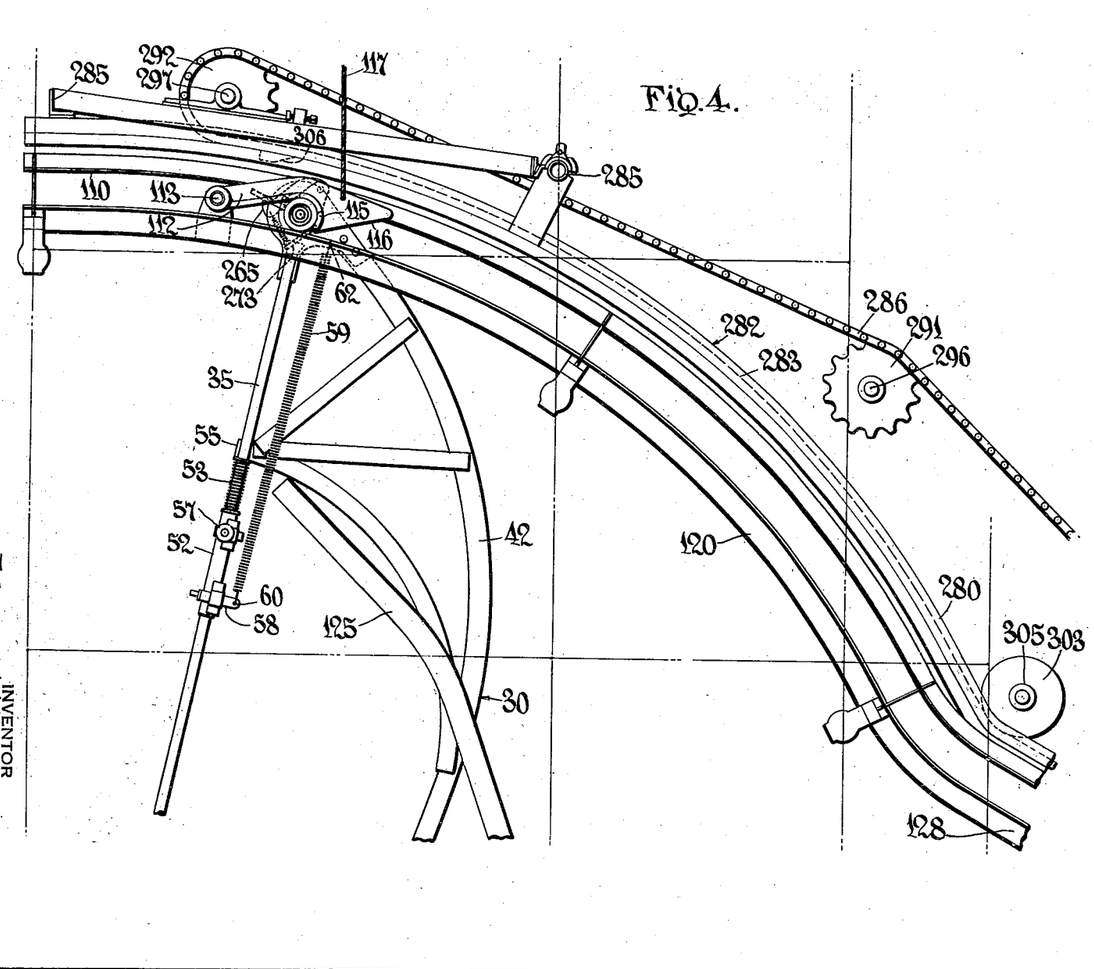
Fig. 4 is a fragmentary side elevation, on a larger scale, of an upper terminal portion of the upper reach of a car supporting track and illustrating the position of the car thereon.
Figure 5:
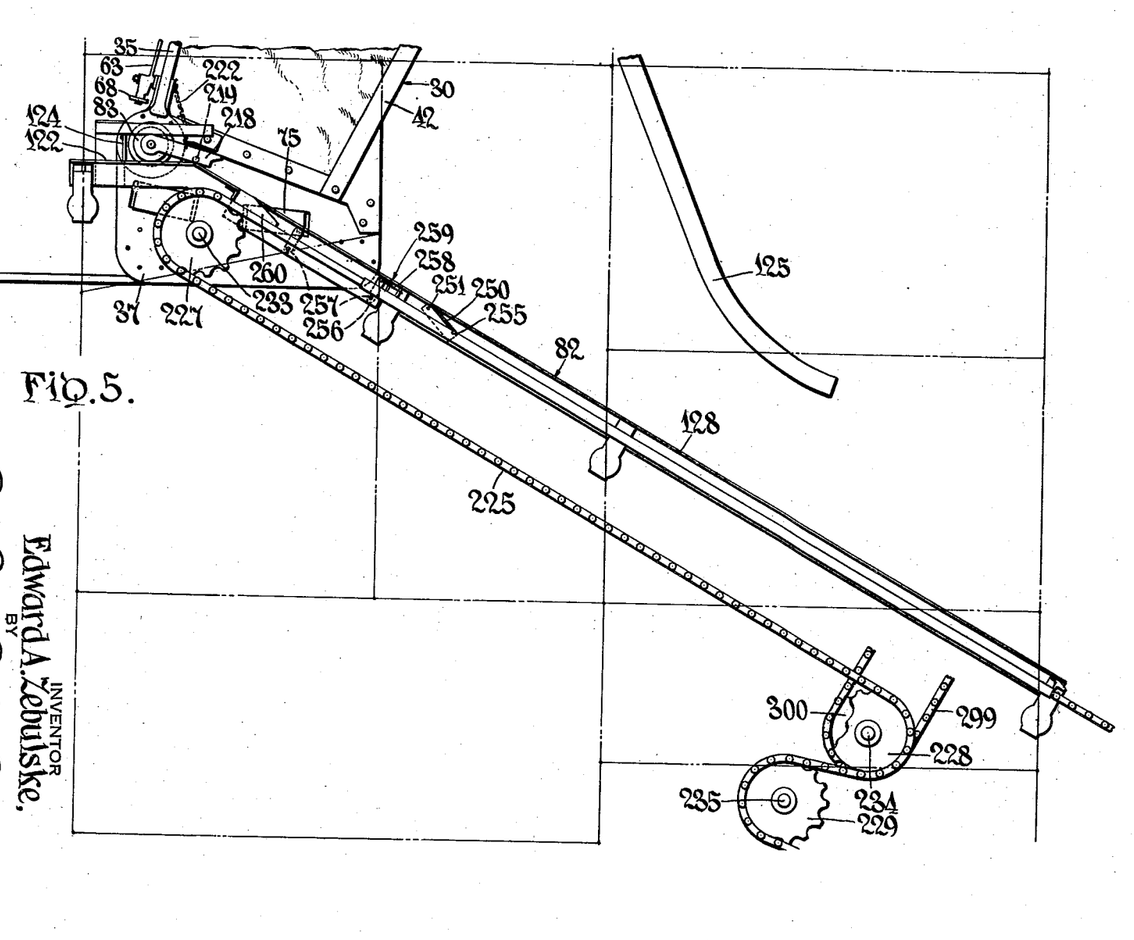
Fig. 5 is a fragmentary side elevation, on a larger scale, of an upper terminal portion of the lower reach of a car supporting track, and illustrating the position of the car thereon.
Figure 6:
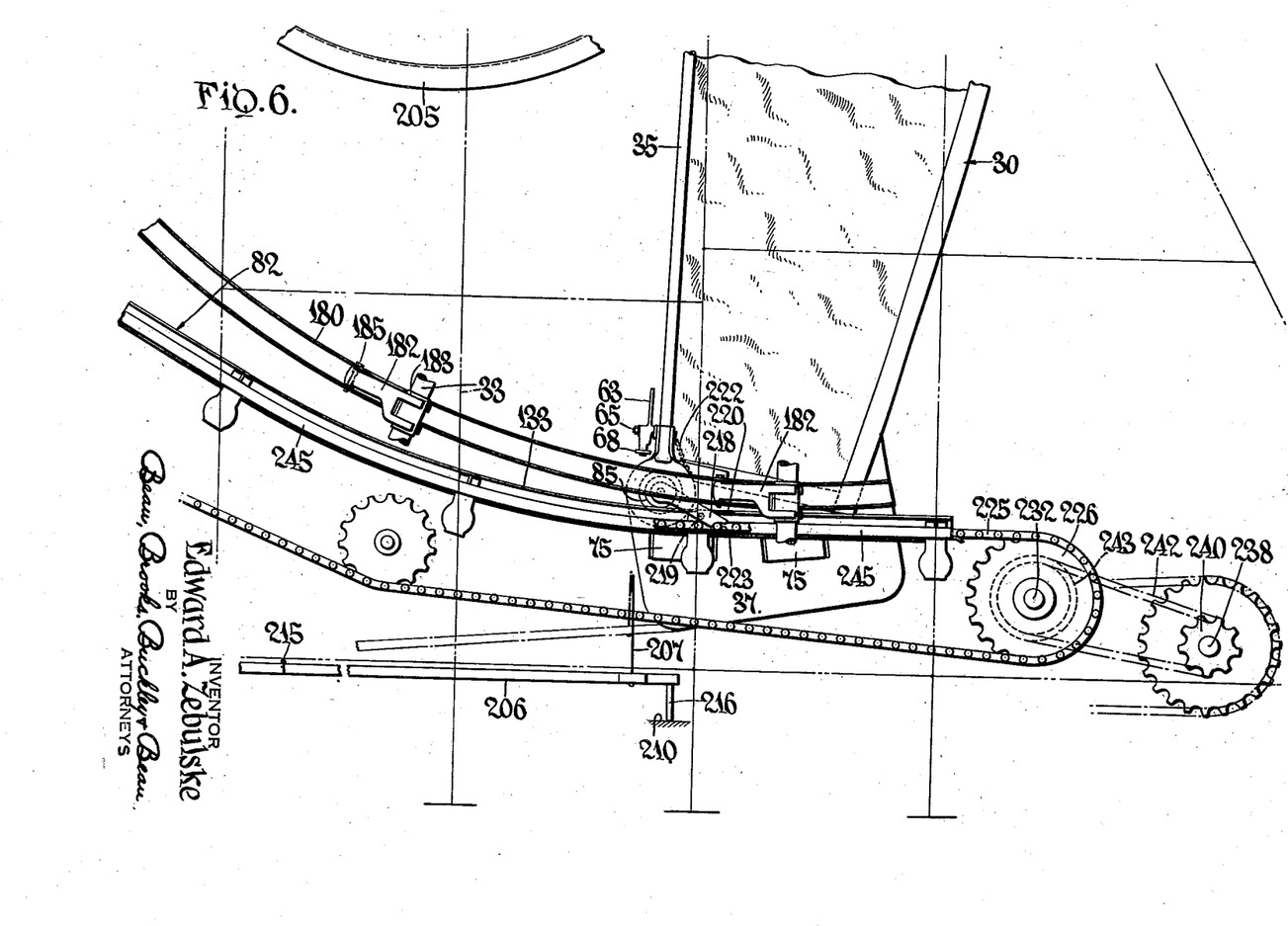
Fig. 6 is a fragmentary side elevation, on a larger scale, of a lower terminal portion of the lower reach of a car supporting track and illustrating the position of the car thereon.

After the passengers have been unloaded, it is desirable to return the car 30 to its original position (Figs. 4 and 5). In order to initiate this operation, the bell crank 165 is actuated to release each upper wheel 83 in response to movement of the latch 142 as it is pivoted in a clockwise direction as viewed in Fig. 3. This operation causes the inner end 145 of the latch to be moved into the path of the wheel 83, and the latter can thus be gradually lowered by camming action along the curved surface 147 of the latch 142 until it is stopped by the outer end of the trip 135. The lower wheels 85 then contact the lower track section 133 (Fig. 6).

A dog 218 (Figs. 6 and 17) is provided with a laterally disposed roller 219 and a dog of this kind is mounted upon each end of the brace 39 about the axis of each wheel 85. The roller 219 projects inwardly beyond the marginal portion of the track and an opening or notch 220 formed in the track permits the roller to assume a position below the surface upon which the wheel rests. A projection 221 extending laterally and rigidly from the dog carries the roller rotatably thereon. The outer end of the dog 218 is limited in its downward movement, when the lower wheels 85, together with the car, are in elevated position above the lower tracks, by means of a flexible member 222 connected to the dog and to the car 30. As the car 30 is lowered in the manner described in the preceding paragraph, the roller 219 passes through the recess 220 and the end of the dog 218 is engaged, as indicated at 223, by one of the links of an endless chain 225 that is trained about sprockets 226, 227, 228, 229 and 230, which are mounted respectively upon transverse shafts 232, 233, 234, 235 and 236, carried in the supporting frame 33. A driven shaft 238 mounted suitably in the frame 33 is connected in a conventional manner (not shown) with a source of power and is provided with a sprocket 240 having a chain 242 thereon for driving another sprocket 243 also connected to the chain. The sprocket 243 is rigidly secured to the shaft 232.

Figure 11:
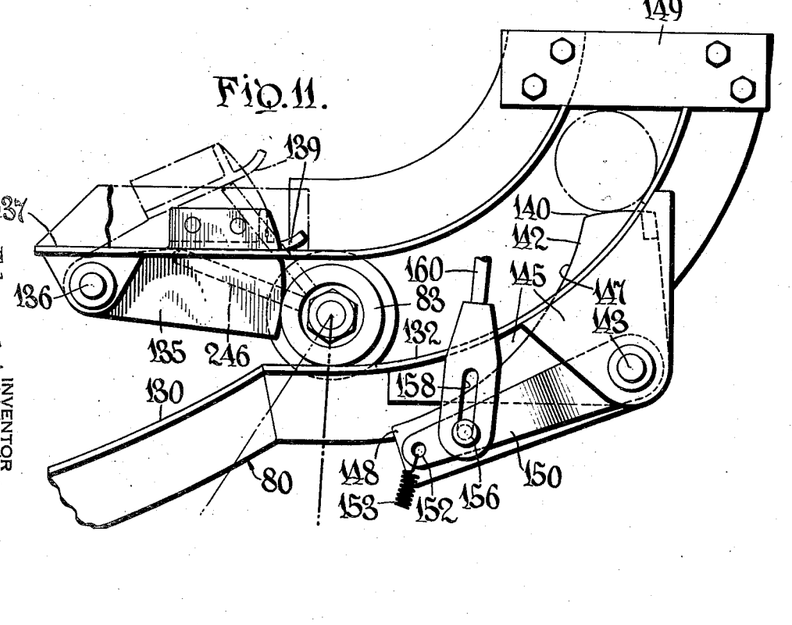
Fig. 11 is a fragmentary side elevation, on a larger scale, of an upper end portion of an upper track structure.
Figure 12:
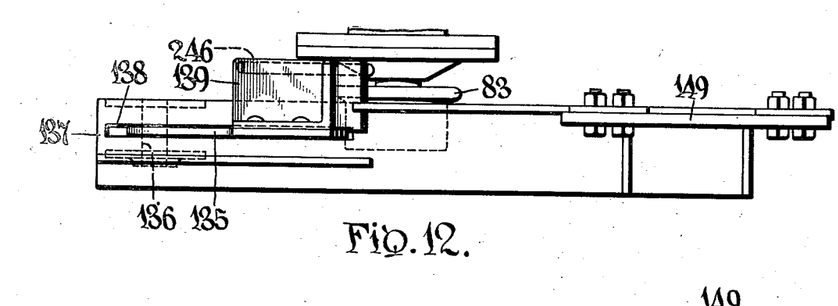
Fig. 12 is a plan, on a larger scale, and including in detail a showing of a rear end of track structure.

A channel member 245 (Figs. 6 and 17) which is disposed adjacent and parallel to the lower track at each side of the car, receives the upper reach of the chain 225, and is disposed in such position that the dog 220 naturally falls through the opening 220 into engagement with the chain in the channel member upon lowering of the car 30. It is to be understood that the curvature of the lower terminal track section 133 is described by lines drawn substantially about the axis of the wheel 83 as it rests upon the inner portion of the upper terminal section 132 in abutting relation against the end of the trip 135. However, before the dog 220 engages the chain 225, it should be understood that the car is disposed in substantially upright position, and that the outer end of an actuating finger 246 (Fig. 11) is rigidly secured upon the end of the transverse brace 39 immediately adjacent each wheel 83, is disposed beneath the laterally extending flange 139 of the trip 135.

The chain 225 then carries the lower end of the car along the lower terminal track section 133 in a slightly upward direction in such manner as to cause the car to assume an inclined position, while each wheel 83 remains temporarily stopped by the end of the trip 135. As the lower wheels 85 approach the end of the arcuate track section 133 the actuating finger 246 contacts at its outer end the lower surface of the flange 139 and raises the trip 135 out of the path of the wheel 83 to the position indicated in broken lines of Fig. 11. The upper end of the car 30 is then free to travel back to its starting position.

The chain 225 continues operating to carry the lower end of the car 30 upwardly and the upper end of the car upon the upper tracks. The roller 219 travels underneath the lower track and prevents the dog 218 from becoming accidentally disengaged from the chain.

Figure 18:
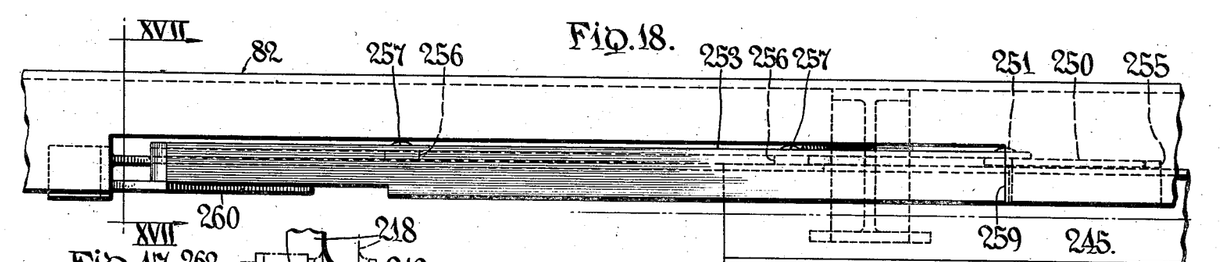
Fig. 18 is a fragmentary plan of a track section for coaction with car shifting mechanism.

Adjacent the upper end of each lower track, the roller 219 engages an angle iron arm 250 that is freely pivoted, as indicated at 251, upon one end portion of a floating track section 253 and the free end of the arm 250 rests under the influence of gravity upon the upper inner edge of the channel member 245, as indicated at 255, in Fig. 18. Parallel links 256 having pivotal end connections 257 at the opposite ends of the floating section 253 and to the track structure are normally maintained at right angles to the adjacent track surface by means of a tension spring 258 connected to the track structure and to the floating track section 253. The latter section is thus maintained in abutting relation at its rear end against the adjacent portion of the track, as indicated at 259.

Since the arm 250 slopes downwardly and is in the path of movement of the roller 219, action of the latter thereon depresses it and the floating section 253 while the links 256 are pivoted downwardly. Hence, the roller 219 passes over the upper surface of the floating section until it reaches a cam 260 that is secured upon the track at one side thereof, and is inclined toward the wheel supporting track surface, as well as being disposed in the path of movement of the inner end portion of the roller 219. This cam actuates the roller upwardly through a gap or cut away portion 262 formed in the outer marginal portion of the track, to receive the floating section and then the roller is actuated to the upper surface of the track 82. This action forces the dog 218 out of engagement with the chain 225. The floating section closes the cut away portion to prevent the dog 218 from engaging the chain when the car is moving down the tracks.

Figure 17:
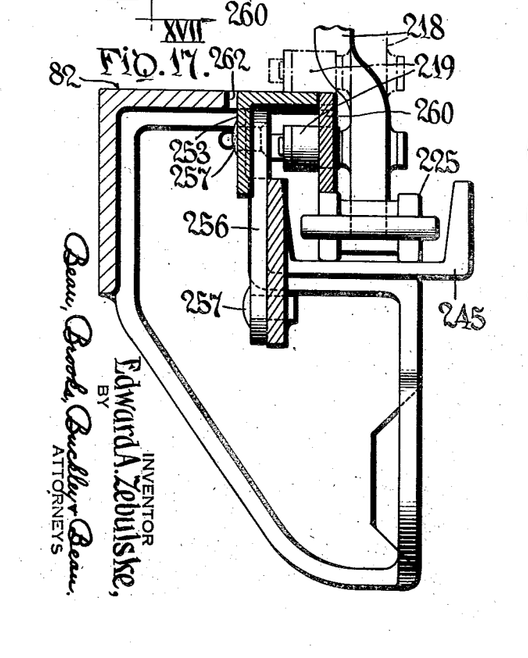
Fig. 17 is a cross section, on a larger scale, taken substantially along the line XVII—XVII of Fig. 18.

After the roller 219 leaves the end of the floating section 253, the latter is actuated to its original position by the spring 258. It should be understood that sufficient track surface adjacent the gap 262 indicated clearly in Fig. 17, is retained to insure proper operation of the wheel 85 on the track surface on each side of car 30.

An intermediate portion of the upper transverse brace 36 is provided with an upper dog 265 pivoted at one end, as indicated at 266 upon a bracket 267 that is rigidly secured upon the upper part of the brace. This dog is provided with a hook 268 at its outer extremity and a pair of rollers 270 project laterally from opposite sides of an intermediate portion of the dog. Suitable projections or pin member 272 carried transversely by the dog rotatably support the rollers thereon. A bracket 273 rigidly mounted upon the lower side of the brace 39 projects outwardly and has a normally tensioned spring 275 connected, as indicated at 276, to the outer bracket end, while the other end of the spring is connected, as indicated at 277, to the outer end of the dog 265. The spring thus constantly urges the dog 265 toward a withdrawn position, that is, to a position wherein it bears against the brace in the manner indicated in Figs. 4 and 9.

As the wheels 83 are drawn up the track 82 in response to action of the chain 225 and before the dog 218 reaches the arm 250, the rollers 270 of the upper dog 265 ride up upon inclined track members 280 which are carried rigidly in a central frame structure 282 having an arcuate section 283 that corresponds in curvature to the arcuate track sections 120 and in substantially parallel relation thereto. These track members 280 are spaced in parallel adjacent relation to provide a clearance indicated at 284, and the upper dog 265 is operable in the space therebetween.

Transverse braces 285 maintain the central frame rigidly in the supporting frame 33. Continued upward movement of the upper end of the car 30 causes actuation of the upper dog 265 in pivotal relation as the rollers 270 are urged upwardly along the inclined tracks 280 and against the tensional action of the spring 275 until the dog is engaged by one of the links of an endless chain 286. At the beginning of the inclined tracks the inclination thereof with reference to the track 80 that supports the wheels 83 is such as to bring the central inclined track end a portion slightly below the path of the rollers 270 and after the dog rides up the inclined track members 280 to the chain 286 the central tracks are then disposed parallel to the wheel carrying tracks 80.

A series of sprockets 290, 291 and 292 are supported immediately above the central frame section 282 upon transverse shafts 295, 296 and 297, respectively, that are, in turn, supported upon the frame 33 in a conventional manner. An additional sprocket 298 axially and rigidly connected, together with the sprocket 290, upon the shaft 295, is provided with a chain 299 having a driving connection with a lower sprocket 300 (Fig. 5), that is rigidly and axially connected to the lower sprocket 228 on the shaft 234. It is to be understood that the radius of the sprocket 290 is greater than the radius of the sprockets 298 and 300, and hence, the upper chain 286 is driven at a greater linear speed than the lower chain 225.

The lower reach of the chain 286 travels upon track flanges 302 which separate the chain from the rollers 270 of the upper dog and constitute a part of the central track structure. The clearance 284 between the sections of the central track members permit the upper dog 265 to travel with the chain while the latter overlaps the flanges 302 that define the upper portion of the central clearance. An idler roller 303 mounted, as indicated at 305, upon the central track 282 prevents the chain from being displaced upwardly from its position between the track members 280.

As the upper portion of the car 30 approaches the position shown in Fig. 4, the wheel 83 on each side of the car impinges upon the inclined or beveled portion 116 of the trip 112, and the wheel is immediately locked against downward movement on the track by moving into engagement with the hook 115 of the trip. At approximately the same time, one or both of the rollers 270 of the upper dog engages a cam 306 carried by the upper end portion of the central track 282, whereby the upper dog 265 is pivoted downwardly out of engagement with the chain 286 and is immediately drawn to its inoperative position shown in Fig. 4.

The car 30 is then in position to be refilled with passengers and the operations described are repeated.

Although only one form of the invention has been shown and described in detail, it will be apparent to those skilled in the art that the invention is not so limited but that various changes can be made therein without departing from the spirit of the invention or from the scope of the appended claims.

I claim:

1. In an installation for amusement rides, an inclined trackway having an elevated front portion and being declined rearwardly, a passenger car having back and seating portions, means for supporting the car on the front portion of the trackway with the car back rearwardly facing the rearwardly declined track portion, means for guiding the car rearwardly down the inclined trackway, and means in the car and trackway for varying the angular relation of the car with respect to the supporting path of the trackway.

2. In an installation for amusement rides, an inclined trackway having an elevated front portion and being declined rearwardly, said trackway having upper and lower track sections, a passenger car having back and seating portions and being normally supported in an upright position upon the trackway, and means for guiding the upper and lower portions of the car along the upper and lower track sections, respectively, at varying relative speeds.

3. In an installation for amusement rides, an inclined trackway having an elevated front portion and being declined rearwardly, a passenger car having back and seating portions and being normally supported in an upright position on the trackway, said trackway having upper and lower track sections supporting upper and lower portions of said car, means included in the trackway for rearwardly tilting the car to a substantially horizontal position as the upper and lower portions thereof travel upon the upper and lower track sections.

4. In an installation for amusement rides, an inclined lower track section having a substantially horizontal front portion at the upper end of the inclined section, an upper arcuate track section having an inclined portion connected thereto, a passenger car normally having its lower portion resting upon said substantially horizontal portion and being movable thereon toward the inclined section, the upper portion of said car engaging the upper arcuate track section, the curvature of the upper arcuate track section being drawn substantially about the lower portion of the car resting upon said horizontal portion whereby the upper portion of the car is tiltable in guided relation along said arcuate section while the lower portion of said car rests temporarily upon said horizontal portion.

5. In an installation for amusement rides, an inclined trackway having an elevated front portion and being declined rearwardly, a passenger car having back and seating portions and being normally supported in an upright position upon the trackway, said trackway having upper and lower track sections engaging upper and lower portions of said car in guiding relation, a trip member mounted upon the upper section of the trackway and engageable with the upper portion of the car in response to movement of the latter in one direction thereagainst, and means for releasing the trip member.

6. In an installation for amusement rides, an inclined trackway having an upper front portion and being declined rearwardly, a passenger car normally supported upon the trackway, said trackway having upper and lower track sections engaging upper and lower portions of said car in guiding relation, means for releasing the car from a position adjacent the upper portion of the trackway whereby the car is freed to travel by gravity rearwardly down the inclined trackway, and means for arresting movement of the upper portion of the car on the upper track, the rear portions of the upper and lower track sections diverging rearwardly whereby the lower portion of the car clears the lower rear portion of the lower track section and swings rearwardly about the rear portion of the upper track section.

7. In an installation for amusement rides, an inclined trackway having an upper front portion and being declined rearwardly, a passenger car having upper and lower portions, said trackway having upper and lower rearwardly declined sections engaging upper and lower portions respectively of said car in guiding relation, means for releasing the car from a position adjacent the front portion of the trackway whereby the car is freed to travel by gravity down the inclined trackway, the rear portion of the upper track section having an arcuate terminal section for receiving the upper portion of the car, said terminal section and the lower rear portion of the lower track section diverging rearwardly, and means for releasably locking the upper portion of the car at the rear portion of the arcuate terminal section.

8. In an installation for amusement rides, an inclined trackway having an upper front portion and being declined rearwardly, a passenger car having upper and lower portions, said trackway having upper and lower rearwardly declined sections engaging the upper and lower portions respectively of said car in guiding relation, means for releasing the car from a position adjacent the front portion of the trackway whereby the car is freed to travel by gravity down the trackway, the rear portions of the upper and lower track sections diverging rearwardly whereby the lower portion of the car clears the lower rear portion of the lower track section and swings rearwardly about the rear portion of the upper track section, means for releasably locking the upper portion of the car adjacent the outer end of the upper track section and being releasable to permit the lowering of the car back to engagement with the lower track section, and means for releasably stopping the upper portion of the car after the lower portion of the car re-engages the lower track section.

9. In an installation for amusement rides, an inclined trackway having an upper front portion and being declined rearwardly, a passenger car having upper and lower portions, said trackway having upper and lower rearwardly declined sections engaging the upper and lower portions, respectively, of said car in guiding relation, means for releasing the car from a position adjacent the front portion of the trackway whereby the car is freed to travel by gravity down the trackway, rear portions of the upper and lower track sections diverging rearwardly whereby the lower portion of the car clears the lower rear portion of the lower track section and swings rearwardly about the rear portion of the upper track section, means for releasably locking the upper portion of the car adjacent the outer end of the upper track section and being releasable to permit the lowering of the car back to engagement with the lower track section, actuating means engageable with the lower portion of the car and operable to carry the latter back up the trackway toward the front of the trackway, means for temporarily stopping the upper portion of the car on the upper track section, and means connected to the upper portion of the car and responsive to movement of the lower portion thereof for releasing the stopping means.

10. In an installation for amusement rides, an inclined trackway having an upper car starting portion and being declined rearwardly, a passenger car mounted for travel rearwardly by gravity on the trackway and having upper and lower portions, said trackway having upper and lower track sections engaging upper and lower portions of said car in guiding relation, means for releasing the car from a position adjacent the upper portion of the trackway whereby the car is freed to travel by gravity rearwardly down the inclined trackway, the rear portions of the upper and lower track sections diverging rearwardly whereby the lower portion of the car clears the lower rear portion of the lower track section and swings rearwardly about the rear portion of the upper track section, means for arresting and supporting the upper portion of the car on the rear portion of the upper track section, means for engaging the lower portion of the car and moving it back toward the upper portion of the lower track, and means for engaging the upper portion of the car and moving it up the inclined upper track section at a different speed from the return movement of the lower portion of the car.

11. In an installation for amusement rides, an inclined trackway having a front upper portion and being declined rearwardly, a passenger car carried by the trackway, said trackway having upper and lower track sections engaging upper and lower portions of said car in guiding relation, means for releasably maintaining the car at the upper portion of the trackway, mechanism for releasing the car from said means whereby the car is freed to travel by gravity rearwardly down the inclined trackway, an endless chain having means driving one reach thereof adjacent the lower track section, a device on the car engageable with the chain at the lower rear portion of the lower track section for returning the car to the upper track portion, an extension on said device for engaging underneath the lower track section, a floating track section in the lower track section having a portion extending into the path of movement of said extension whereby the floating section is actuated by movement of the extension thereagainst, and a cam member on the lower track section engageable with the extension for disengaging the endless chain from the device.

12. In an installation for amusement rides, an inclined trackway having a front upper portion and being declined rearwardly, a passenger car carried by the trackway, said trackway having upper and lower track sections engaging upper and lower portions of said car in guiding relation, means for releasably maintaining the car at the upper portion of the trackway, mechanism for releasing the car from said means whereby the car is freed to travel by gravity rearwardly down the inclined trackway, an endless chain having means driving one reach thereof adjacent the lower track section, a device on the car engageable with the chain at the lower rear portion of the lower track section for returning the car to the upper track portion, an extension on said device for engaging underneath the lower track section as the car is moved up the inclined trackway, a releasing member connected to the upper portion of the trackway in the path of said extension and responsive to movement of the car to release the chain from said device, and means for moving the upper portion of the car up the inclined portion of the upper track section.

13. In an installation for amusement rides, an inclined trackway having a front upper portion and being declined rearwardly, a passenger car carried by the trackway, said trackway having upper and lower track sections engaging upper and lower portions of said car in guiding relation, means for releasably maintaining the car at the upper portion of the trackway, mechanism for releasing the car from said means whereby the car is freed to travel by gravity rearwardly down the inclined trackway, driven means supported adjacent the lower track section and engageable with the lower portion of the car to carry the latter toward the upper front portion of the trackway, a driven endless chain having supports adjacent the upper track section for actuating the upper portion of the car along the upper track section at a speed different from that of the driven means, releasable means on the upper portion of the car engageable with said chain in response to movement of the car by said driven means, and means for disengaging said releasable means in response to movement of the upper portion of the car to a position adjacent the upper portion of the trackway.

EDWARD A. ZEBULSKE.